(12) United States Patent
Parfenov et al.

(10) Patent No.: US 11,043,047 B2
(45) Date of Patent: Jun. 22, 2021

(54) METHOD FOR STATUS MONITORING OF A HEAT EXCHANGER AND HEAT EXCHANGER

(71) Applicant: AKG THERMOTECHNIK INTERNATIONAL GMBH & CO. KG, Hofgeismar (DE)

(72) Inventors: Vladimir Parfenov, Kassel (DE); Andreas Strehlow, Hofgeismar (DE)

(73) Assignee: AKG THERMOTECHNIK INTERNATIONAL GMBH & CO. KG, Hofgeismar (DE)

( * ) Notice: Subject to any disclaimer, the term of this patent is extended or adjusted under 35 U.S.C. 154(b) by 259 days.

(21) Appl. No.: 16/190,724

(22) Filed: Nov. 14, 2018

(65) Prior Publication Data

US 2019/0164364 A1 May 30, 2019

(30) Foreign Application Priority Data

Nov. 28, 2017 (DE) ...................... 10 2017 128 122.3

(51) Int. Cl.
*G07C 5/08* (2006.01)
*B60W 20/00* (2016.01)

(52) U.S. Cl.
CPC ........... *G07C 5/0808* (2013.01); *B60W 20/00* (2013.01); *G07C 5/085* (2013.01); *G07C 5/0816* (2013.01)

(58) Field of Classification Search
CPC ............................ G07C 5/0808; G07C 5/0816
See application file for complete search history.

(56) References Cited

U.S. PATENT DOCUMENTS 5,385,202 A 1/1995 Drosdziok et al.
6,308,702 B1 * 10/2001 Huyghe .................. F24H 3/105
126/110 B (Continued)

FOREIGN PATENT DOCUMENTS

AT 009862 U2 4/2008
DE 4035242 A1 5/1992

(Continued)

OTHER PUBLICATIONS

Search Report dated Aug. 27, 2018 in related DE Application No. 10 2017 128 122.3.

*Primary Examiner* — Alan D Hutchinson
*Assistant Examiner* — Andy Schneider
(74) *Attorney, Agent, or Firm* — Patent Portfolio Builders PLLC

(57) ABSTRACT

A motor vehicle heat exchanger includes multiple first flow channels of a coolant medium arranged one over another, second flow channels of a process medium arranged between the first flow channels and provided at their ends with collection boxes, multiple sensors for detecting operating parameters and elongations of the heat exchanger and also a memory are arranged on and/or in the heat exchanger. Status monitoring of the heat exchanger involves obtaining measure values of an operating parameter from the sensors and storing the measured values in the memory. Characteristic values of the heat exchanger and the measured values stored in the memory are loaded into an analysis unit. The analysis unit, using analysis software, analyzes the measured values. An updated damage value of the heat exchanger is calculated and then stored in the memory and output.

14 Claims, 2 Drawing Sheets

(56) References Cited

U.S. PATENT DOCUMENTS

Figure 1:
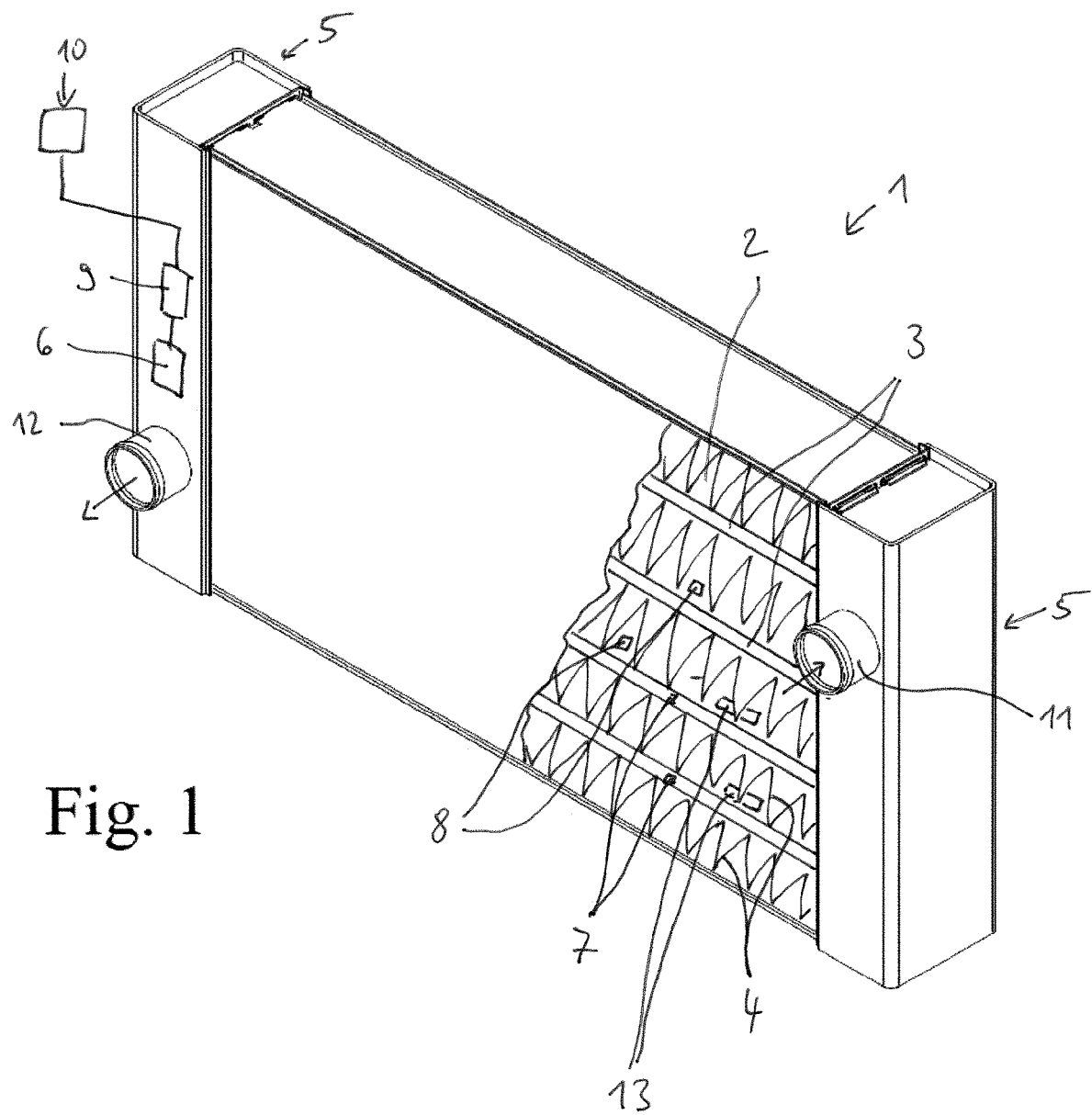

| | | | | |
|---|---|---|---|---|
| 6,523,999 B1* | 2/2003 | Ishii | ............ | G01N 3/60 |
| | | | | 374/47 |
| 7,840,362 B2 | 11/2010 | Mayrhofer et al. | | |
| 2006/0020420 A1* | 1/2006 | Vesel | ............ | F28F 27/00 |
| | | | | 702/182 |
| 2009/0188645 A1* | 7/2009 | Harpster | ............ | F28B 11/00 |
| | | | | 165/11.1 |
| 2013/0255603 A1* | 10/2013 | Pursifull | ............ | F01P 11/16 |
| | | | | 123/41.15 |
| 2018/0290121 A1 | 10/2018 | Takeuchi et al. | | |

FOREIGN PATENT DOCUMENTS

| | | |
|---|---|---|
| DE | 4226010 A1 | 2/1994 |
| DE | 10257793 A1 | 7/2004 |
| DE | 102009057135 A1 | 6/2011 |
| DE | 102012105198 A1 | 12/2013 |
| DE | 102012218899 A1 | 4/2014 |
| JP | 2017131796 A | 8/2017 |

* cited by examiner

METHOD FOR STATUS MONITORING OF A HEAT EXCHANGER AND HEAT EXCHANGER

BACKGROUND AND SUMMARY OF THE INVENTION

Exemplary embodiments of the present invention relate to a method for status monitoring of a heat exchanger and a heat exchanger.

In order to monitor the status of heat exchangers, the heat exchangers are equipped with sensors for detecting operating parameters, such as temperature, pressure, flow rate, or the like and feeding the operating parameters detected using the sensors into control units for regulating the present operation is known from the prior art.

Such methods have proven themselves as such in practice

The known methods and heat exchangers have the disadvantage that they are supplied to maintenance after a previously defined duration or are replaced upon reaching a predetermined operating life.

In this case, it can occur that such a heat exchanger is damaged so much in operation before reaching its predetermined operating life that a removal for replacement or repair of the heat exchanger is necessary.

This has the disadvantage that the user has to keep one or more replacement devices ready to be able to further use the motor vehicle or the like equipped with the heat exchanger.

It is also disadvantageous when the heat exchanger is routinely replaced as a result of the expiration of predefined operating hours or other predefined parameters, although the damage of the heat exchanger that has occurred up to this point is still sufficiently low, for example, as a result of lower load, that the heat exchanger could still have been used further for a long time.

Exemplary embodiments are directed to a method for status monitoring of a heat exchanger having a further improved status monitoring, using which the spontaneously required replacement of such a heat exchanger can be avoided as much as possible.

Furthermore, exemplary embodiments are directed to a heat exchanger having a more accurately predicted service life.

A method according to the invention for status monitoring of a heat exchanger, in particular of a motor vehicle, having multiple first flow channels of a coolant medium arranged one above another and also second flow channels of a process medium arranged between the first flow channels and provided at their ends with collection boxes, wherein multiple sensors for detecting operating parameters and elongations of the heat exchanger in multiple measurement points and a memory are arranged in the heat exchanger, has the following method steps:

- detecting measured values of the operating parameters and/or elongations of the heat exchanger by way of the sensors,
- storing the measured values in the memory,
- loading characteristic values of the heat exchanger and the measured values stored in the memory into an analysis unit,
- analyzing the measured values in the analysis unit using analysis software,
- calculating an updated damage value of the heat exchanger,
- storing the updated damage value in the analysis unit, and
- outputting the updated damage value to an output unit.

Such a status monitoring method has the advantage that an upcoming maintenance or replacement of such a heat exchanger is monitored in operation by operating parameters detected in operation and, influenced by the operating mode of the heat exchanger, the damage value, and/or a service life prognosis of the heat exchanger determined therefrom is continuously updated.

Continuously adapting the damage value of the heat exchanger to the operating mode and thus being able to output a signal is enabled in this way, by which maintenance or replacement of the heat exchanger is recommended, in a timely manner, but also not too early.

According to one advantageous embodiment variant of the method according to the invention, the respective updated damage value is transmitted to a central detection unit outside the heat exchanger.

This central detection unit can be a control of a motor vehicle in this case, in which the heat exchanger is installed, so that the damage value of the heat exchanger can be detected and displayed via a display of the motor vehicle controller.

It is also conceivable to keep ready such a central detection unit at the producer of the heat exchanger, wherein the measured values and the present damage value can be detected in the central detection unit and, for example, further analyzed in this regard.

Thus, for example, with correspondingly large collected data pool, for example, statistical analyses may be derived to derive optimization potentials for the heat exchanger.

According to a further preferred embodiment variant, present measured operating parameters are compared to operating parameters of a preceding measurement during the calculation of the damage value.

Thus, for example, inferences about possible damage to the heat exchanger, which influences the service life of the heat exchanger, may be derived from changed operating parameter values.

The heat exchanger according to the invention has multiple first flow channels of a coolant medium arranged one over another and second flow channels of a process medium arranged between the first flow channels and provided at their ends with collection boxes, and also multiple sensors for detecting operating parameters, in particular temperature and/or pressure and/or elongations and/or material temperature of the heat exchanger.

The heat exchanger has in this case an analysis unit, which is designed for carrying out the above-described method.

BRIEF DESCRIPTION OF THE DRAWING FIGURES

Figure 2:
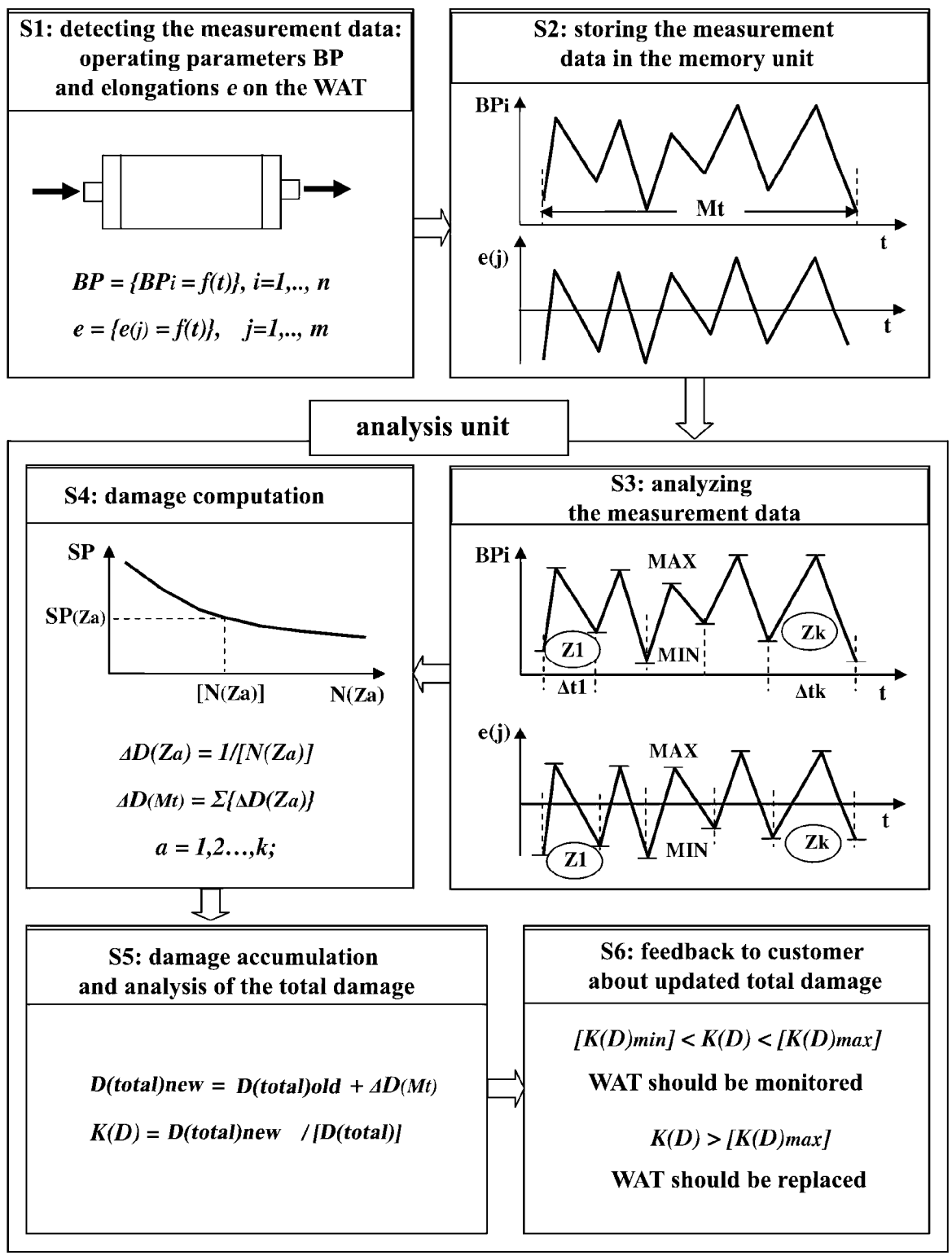

Exemplary embodiments of the invention will be explained in greater detail hereafter on the basis of the appended drawings. In the figures:

FIG. 1 shows a schematic perspective illustration of one exemplary embodiment of a heat exchanger and FIG. 2 shows an exemplary flow chart of the method according to the invention.

DETAILED DESCRIPTION

In the following description of the figures, terms such as top, bottom, left, right, front, rear, etc. exclusively relate to the exemplary illustration and position of the heat exchanger, the flow channels, collection boxes, memory, analysis unit, and the like selected in the respective figures.

These terms are not to be understood as restrictive, i.e., these references can change due to various operating positions or the mirror-symmetrical design or the like.

One embodiment variant of a heat exchanger according to the invention is identified as a whole with the reference sign 1 in FIG. 1.

The heat exchanger 1 essentially consists in this case of a plurality of first flow channels 2, arranged one over another, for conducting through a coolant medium and also second flow channels 3, arranged between the first flow channels 2 and provided at their ends with collection boxes 5, for conducting through a process medium, for example, a coolant, oil, or air, in particular compressed air.

The heat exchanger 1 additionally has multiple sensors 7, 8, 13, which are used to detect operating parameters such as temperature, pressure, and the elongation of the exchanger.

Thus, for example, temperature sensors are arranged on or in the flow channels 2, 3, using which the temperature of the coolant medium and/or the process medium and also the material temperature of the second flow channels 3 are detectable.

Pressure sensors are preferably also arranged in the flow channels 2, 3, using which a respective current pressure in the respective flow channels 2, 3 is detectable.

The entry and exit temperatures and also the pressure of the process medium are detectable using similar sensors in entry and exit fittings 11 and 12.

All sensors are coupled to a memory 6, which is used to record and store the measured data.

The memory 6 is coupled to an analysis unit 9. The analysis unit 9 preferably has a programmable processor. An output unit 10 for outputting a result determined in the processor, based on a total damage factor K(D) explained in greater detail hereafter, is connected to the analysis unit in a wired or wireless manner.

The processor is preferably programmed in this case such that an updated service life value and/or total damage factor K(D) of the heat exchanger 1 is computed from the measured data on the heat exchanger and also fixed parameters of the heat exchanger 1 previously stored in the memory, for example, material characteristics of the components of the heat exchanger 1 and the like.

One embodiment variant of the method according to the invention is to be described on the basis of the exemplary flow chart shown in FIG. 2.

In a method step S1, after recognition of operation of the heat exchanger 1, the sensors 7, 8, 13 are activated, which detect the present operating parameters $BP_i$ and elongations $e_j$ and material temperatures of the heat exchanger 1 at multiple measuring points.

One of each such sensor 7, 8 is schematically shown by way of example in FIG. 1. Such sensors 7, 8, 13 are preferably placed at a plurality of points of the heat exchanger 1. It is conceivable in this case to use separate sensors for each operating parameter and also elongation and material temperature. It is also conceivable to use sensors which are capable of detecting multiple measured variables.

In a method step S2, the operating parameters and/or elongations detected over the operating life t are stored in a memory 6.

In a method step S3, the stored operating parameter curves are loaded into an analysis unit 9.

In addition, further fixed characteristic values of the heat exchanger 1 are loaded into the analysis unit 9.

In the analysis unit, first a number of cycles $Z_{1, \ldots, k}$ run through during the operating life of the heat exchanger and also the cycle times $\Delta t1, \ldots, \Delta tk$ of the cycles are determined. Such a cycle Z is defined in this case by two minima MIN, separated from one another by a maximum MAX, of measured operating parameters BT or elongation values e, respectively In a method step S4, an analysis of the measured operating parameters BT and elongations e is carried out with the aid of the processing software stored in the processor such that a stored damage value of the heat exchanger 1 is updated based on the measured operating parameters BT and the analysis performed in step S3, wherein the updated damage value is then stored again in the analysis unit 9.

Furthermore, the damage parameter SP of each of these cycles $Z_{1, \ldots, k}$ is ascertained, since this has an effect on the load of the heat exchanger 1.

During the analysis, the individual cycles $Z_{1, \ldots, k}$ are analyzed with the aid of SP Wöhler lines to determine the damage resulting therefrom to the heat exchanger 1.

A diagram in which the number of cycles of operating parameter variations is determined in a continuous experiment until total damage of the examined object, the heat exchanger here, is reached is understood as a Wöhler line. The Wöhler lines were previously determined for this purpose in laboratory experiments.

In the analysis described here, a respective limit number $N_{Za}$ of cycles is determined from the determined damage parameters $SP_{Za}$ with the aid of the damage parameter Wöhler line, from which a damage $\Delta D(Za)$ to the heat exchanger 1 during the cycle Za is determined, that is to say a respective partial damage at each of the measuring points.

This damage $\Delta D(Za)$ is then added up for all cycles to form a total damage value $\Delta D(M)$ for the time of the performed measurement.

In a step S5, a damage accumulation and analysis of a present total damage D(total)new of the heat exchanger 1 is performed, wherein the total damage value $\Delta D(M)$ determined in step S4 is added to the damage value D(total)old stored in the memory 6 before the beginning of the measurement.

Finally, a total damage factor K(D) for the heat exchanger 1 in real operation, which is defined by the quotient of the value for the present total damage D(total)new and a maximum permissible total damage D(total), is important for the user of the heat exchanger 1.

This permissible total damage D(total) can be defined in this case by the user of the heat exchanger 1 and is preferably between, for example, 0.5 and 1, wherein 1 means a total damage to the heat exchanger 1.

It is also conceivable to equip the analysis unit 9 with a data exchange unit, for example, in the form of a cable connection or a transmitter unit for wireless transmission of data, to be able to transmit the respective updated total damage factor K(D) to a central detection unit outside the heat exchanger 1.

In this case, for example, a control unit of a motor vehicle in which the heat exchanger 1 is installed can be used as the central detection unit, so that the driver of the motor vehicle can always be informed about the present service life of the heat exchanger 1, for example, via a status display of this central detection unit.

It is also conceivable, as shown in step S6, to output a simplified message to a user of the heat exchanger 1 or customer as a function of the determined total damage factor K(D), wherein, if the total damage factor K(D) is between a permissible minimum value [k(D)min] determined by the user of, for example, 0.85 and a permissible maximum value [k(D)max] of, for example, 0.98, a warning message is output and if the maximum value [k(D)max] is exceeded, a request is output to replace the heat exchanger 1.

It is also conceivable to provide such a central detection unit, for example, at the producer of the heat exchanger.

Therefore, for example, carrying out statistical analyses of the data pool, for example, on the basis of the data transmitted to the central detection unit is enabled in the case of a sufficiently large data pool, in particular to be able to derive the derivation of optimization potentials of the respective heat exchanger or a construction series of such a heat exchanger.

If individual values deviate from setpoint values during successive detection procedures of operating parameters by the sensors or if measured values deviate from one another during successive measurement procedures, in particular possible damage to the heat exchanger can be inferred.

Such damage detected during the measurement is then incorporated into the computation of the updated service life.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 heat exchanger
2 first flow channels
3 second flow channels
4 lamella
5 collection box
6 memory
7 sensor
8 sensor
9 analysis unit
10 output unit
11 inlet
12 outlet
WAT heat exchanger
BP operating parameters for process and coolant media in the WAT (for example, pressure, temperature, mass flow),
e elongations and material temperatures in various measuring points on the WAT,
$BP_i$ i operating parameters for process and coolant media in the WAT, i=1, ... n,
e(j) elongation in in j measurement point on the WAT, j= 1, ..., m,
Mt running measurement on the WAT in real operation,
t time,
MAX maximum (upper) values of the measured operating parameters and elongations in each cycle during the measurement Mt,
MIN minimum (lower) values of the measured operating parameters and elongations in each cycle during the measurement Mt,
Z1, ..., Zk cycles during the measurement Mt,
Δt1, ..., Δtk cycle times for cycles during the measurement Mt,
SP damage parameter for Wöler line,
N(Za) cycle number,
SP(Za) damage parameter for WAT because of the load during cycle Za,
[N(Za)] permissible maximum cycle number in the case of load during cycle Za,
ΔD(Za) damage to the WAT because of load during cycle Za,
ΔD(M) damage to the WAT during running measurement Mt,
D(total)old total damage to the WAT before the running measurement Mt,
D(total)new updated total damage to the WAT after the running measurement Mt,
k(D) total damage factor for WAT in real operation,
[D(total)] maximum permissible total damage of the WAT
[k(D)min] permissible minimum total damage factor for WAT,
[k(D)max] permissible maximum total damage factor for WAT

What is claimed is:

1. A method for status monitoring of a motor vehicle heat exchanger, method comprising:
    obtaining measured values of an operating parameter of the heat exchanger and elongation of the heat exchanger from a plurality of sensors, which are arranged on and/or in the heat exchanger, while a coolant medium flows through
    multiple first flow channels arranged one over another and second flow channels arranged between the first flow channels, and while the coolant medium flows between the second flow channels and collection boxes arranged at ends of the second flow channels;
    storing the measured values in a memory arranged on and/or in the heat exchanger;
    loading material characteristic values of components of the heat exchanger, the measured values stored in the memory, and a previously determined damage value of the heat exchanger into an analysis unit;
    analyzing, by the analysis unit using analysis software, the measured values;
    calculating, using the analyzed measured values and the previously determined damage value, an updated damage value of the heat exchanger;
    storing the updated damage value in the memory; and
    outputting a value, which is based the updated damage value, to an output unit.

2. The method of claim 1, wherein the updated damage value is transmitted to a central detection unit outside of the heat exchanger.

3. The method of claim 1, wherein the calculation of the damage value comprises comparing present measured operating parameters to operating parameters of the preceding measurement.

4. The method of claim 1, wherein the elongation of the heat exchanger is determined at multiple measuring points of the heat exchanger.

5. The method of claim 1, wherein a temperature of the heat exchanger is determined at multiple measuring points of the heat exchanger as the operating parameter.

6. The method of claim 1, wherein a pressure in the heat exchanger is determined at an entry and exit of the heat exchanger as the operating parameter.

7. The method of claim 1, wherein a temperature of the process medium in the heat exchanger is determined at an entry and exit of the heat exchanger as the operating parameter.

8. The method of claim 1, further comprising:
determining a present total damage of the heat exchanger by determining individual damages by adding to the damage value of the heat exchanger stored in the memory a summation of a plurality of measured operating parameters and elongations.

9. The method of claim 1, wherein the value based on the updated damage value is a total damage factor, which is determined by:
dividing the updated damage value by a maximum permissible total damage for the automobile heat exchanger.

10. A motor vehicle heat exchanger, comprising:
a plurality of first flow channels of a coolant medium arranged one over another;
second flow channels of a process medium arranged between the first flow channels;
collection boxes arranged at ends of the second flow channels;
a plurality of sensors configured to measure operating parameters of the heat exchanger;
a memory;
an output unit; and
an analysis unit coupled to the plurality of sensors and the memory, the analysis unit is configured to
obtain measured values of the operating parameter from the plurality of sensors,
store the measured values in the memory,
load material characteristic values of components of the heat exchanger, the measured values stored in the memory, and a previously determined damage value of the heat exchanger into the analysis unit,
analyze the measured values,
calculate, using the analyzed measured values and the previously determined damage value, an updated damage value of the heat exchanger,
store the updated damage value in the analysis unit, and
output a value, which is based the updated damage value, to the output unit.

11. The motor vehicle heat exchanger of claim 10, wherein the value based on the updated damage value is a total damage factor, and the analysis is configured to determine the total damage factor by:
dividing the updated damage value by a maximum permissible total damage for the automobile heat exchanger.

12. A method, comprising:
storing a damage value of an automobile heat exchanger in a memory arranged on or in the automobile heat exchanger;
measuring, by a plurality of sensors arranged on or in the automobile heat exchanger, values of an operating parameter of the automobile heat exchanger and a elongation of the automobile heat exchanger;
determining, by an analysis unit, a new damage value of the heat exchanger based on the measured values and Wölher lines;
calculating, by the analysis unit, an updated damage value of the automobile heat exchanger based on the stored damage value and the new damage value; and
outputting a value, which is based on the updated damage value, to an output unit.

13. The method of claim 12, wherein the value based on the updated damage value is a total damage factor, which is determined by:
dividing the updated damage value by a maximum permissible total damage for the automobile heat exchanger.

14. The method of claim 12, wherein the determination of the new damage value is further based on analysis, by the analysis unit, of a number of cycles run through during an operating life of the automobile heat exchanger.

* * * * *